Feb. 21, 1961 W. H. ELLIOT ET AL 2,972,684
ELECTRICAL CONTROLLER
Filed June 6, 1958 2 Sheets-Sheet 1

Inventors
William H. Elliot
Derald L. Yager
By Wm. A. Autio
Attorney

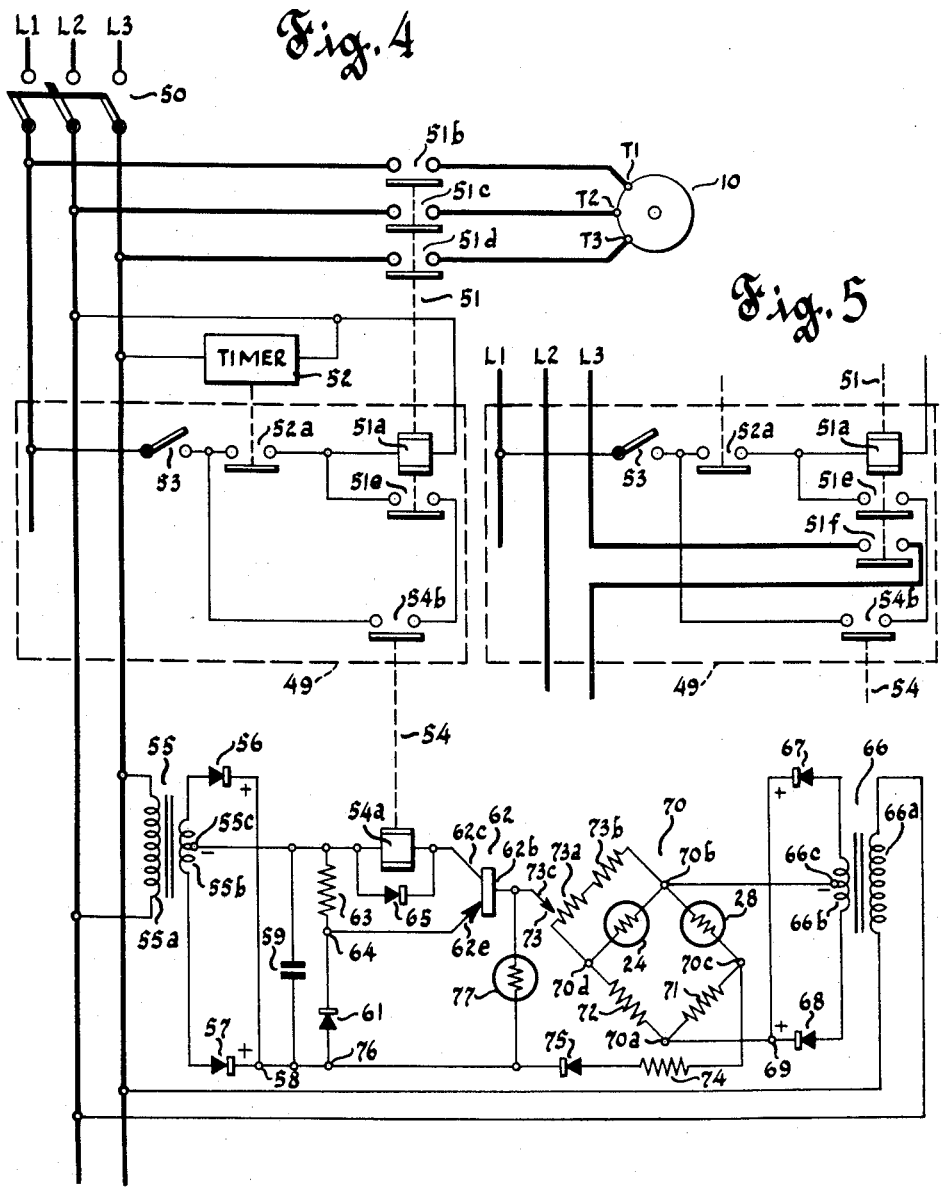

United States Patent Office 2,972,684
Patented Feb. 21, 1961

2,972,684
ELECTRICAL CONTROLLER

William H. Elliot and Gerald L. Yager, Milwaukee, Wis., assignors to Cutler-Hammer, Inc., Milwaukee, Wis., a corporation of Delaware Filed June 6, 1958, Ser. No. 740,233

6 Claims. (Cl. 307—88.5)

This invention relates generally to electrical controllers. More particularly it relates to condition responsive means for achieving a control function.

When an oil well "pumps off," that is to say, when the oil level therein declines so that continued pumping no longer produces a relatively continuous flow of oil but produces large quantities of gas instead, it is usually necessary to discontinue pumping until the oil level is restored. Furthermore, it is advantageous to stop pumping in order to conserve power and to avoid needless wear on pump equipment or possible damage thereto. Presently, programming controllers are employed to confine pump operation to estimated productive intervals and to stop pumping during estimated non-productive intervals, but since well characteristics may be erratic or change over a period of time it is preferable to employ with the programming controller additional control apparatus responsive to actual conditions within the well. Pressure responsive apparatus employed for this purpose has not proven entirely satisfactory.

Accordingly, it is an object of this invention to provide improved thermal responsive means for achieving a control function.

Another object is to provide an improved circuit employing temperature responsive resistance means and amplifying means to achieve a control function in response to thermal conditions.

Still another object is to provide an improved circuit for controlling an electroresponsive device which comprises a temperature responsive bridge circuit and amplifiers.

A further object is to provide a circuit of the aforesaid character wherein said temperature responsive bridge includes thermistors and said amplifier includes a transistor.

Other objects and advantages of the invention will hereinafter appear.

The accompanying drawings illustrate preferred embodiments of the invention, it being understood that the embodiments illustrated are susceptible of modifications with respect to certain details thereof without departing from the scope of the appended claims.

Referring to the drawings:

Fig. 4 is a diagrammatic showing of a motor controller incorporating the probe shown in Figs. 1, 2 and 3; and Fig. 5 illustrates diagrammatically a modification of the controller shown in Fig. 4.

Figure 1:
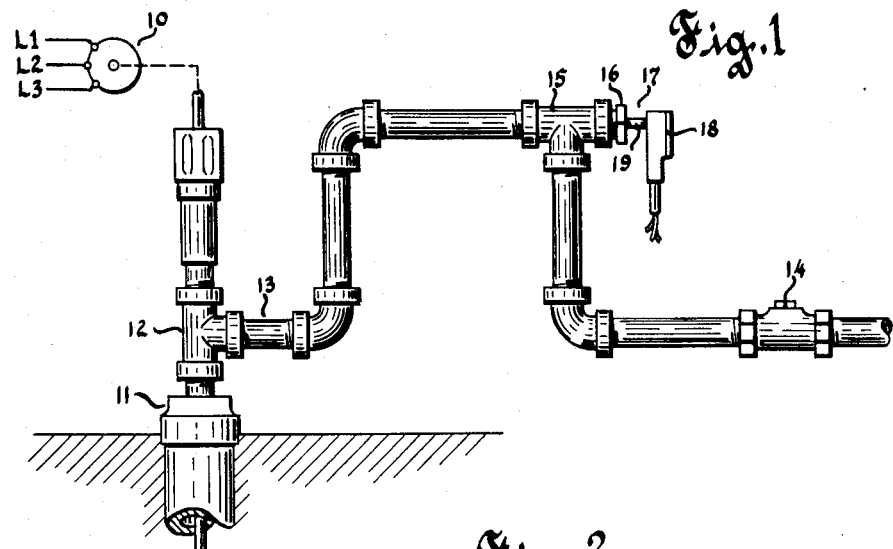
Figure 1 is a view, partly in elevation and partly in schematic form, showing a portion of an oil well pumping installation with which the invention is employed.

Figure 1 shows an A.C. electric motor 10 adapted to drive a pump (not shown) located at the bottom of an oil well casing 11. Oil raised by the pump flows from a pumping T 12 atop well casing 11 through a lead line or flow line 13 to suitable storage facilities (not shown) and is prevented from flowing back into well casing 11 by a check valve 14. Between pumping T 12 and check valve 14 flow line 13 is arranged in the form of an inverted U which drains free of oil when oil flow ceases for any reason. The U-shaped portion of flow line 13 includes a conventional T-shaped pipe fitting 15 which is adapted by a suitable pipe reducer fitting 16 employed therewith to accommodate a heavy duty thermistor probe 17 which forms part of the electrical controller for motor 10, as will be more fully explained hereinafter in connection with Fig. 4. Attached to probe 17 is junction box 18, preferably of the explosion-proof type, which facilitates the attachment of heavier electrical conductors to the fine wire leads of the probe. Probe 17 is adapted to determine the presence or absence of oil flow in flow line 13.

Figure 2:
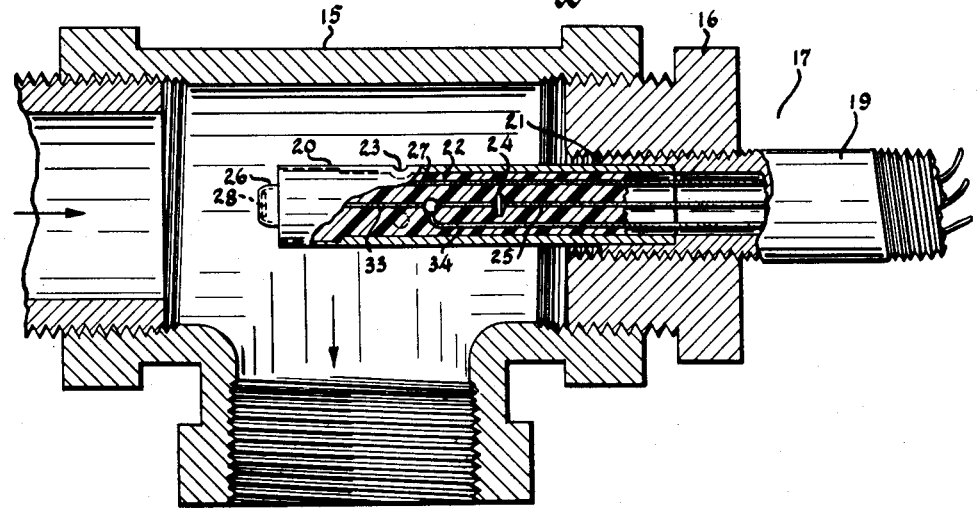
Fig. 2 is an enlarged view, partly in section and partly in elevation, of a portion of the installation shown in Fig. 1 and showing in detail a probe employed therewith.

Fig. 2 shows the manner in which probe 17 is disposed within flow line 13 so as to be well in the path of crude oil which flows therethrough. Probe 17 is constructed to withstand buffeting and abrasion from foreign matter carried by the crude oil, and to resist the corrosive action of the crude oil. Nevertheless the probe 17 is extremely sensitive from the thermal standpoint. Probe 17 is provided with a hollow nipple 19, externally threaded at both ends, which adapts it to be screwed into reducer fitting 16 and to be attached to junction box 18. The bore of nipple 19 widens at the left end thereof to accommodate one end of a hollow, cylindrical, open-ended tube 20 which is brazed and sealed therein as indicated by the numeral 21. Tube 20 is filled with a solidified mass of moisture impervious, corrosion resistant, electrical insulating material such as an epoxy resin 22 which is prevented from being dislodged under pressure by a plurality of indentations 23 formed in the wall of the tube. A thin, disc-shaped thermistor 24 which is silver plated on its opposite flat surfaces to facilitate the attachment of electrical conductors thereto is embedded in the resin 22 substantially near the middle of tube 20. Thermistor 24 will be more particularly described hereinafter. One end of an insulated wire conductor 25 which is embedded in the resin 22 is soldered to the right side of thermistor 24 and the other end thereof extends from the end of the probe. Preferably wire conductor 25 and all other wire conductors within the probe are of relatively small diameter to inhibit heat dissipation from the thermistors.

Figure 3:
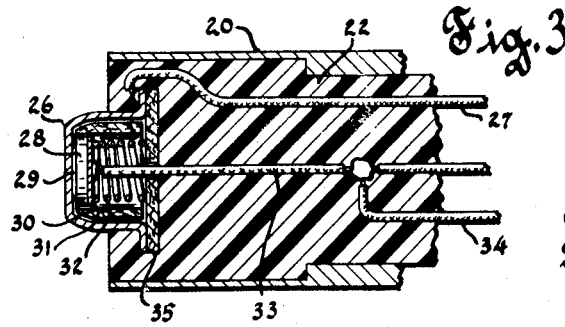
Fig. 3 is a greatly enlarged sectional view of a portion of the probe shown in Fig. 2.

Figs. 2 and 3 together show that a hollow, thin walled, cup-shaped, flanged probe tip 26 is firmly embedded in the resin 22 and projects beyond the left end of tube 20. The wall of tube 20 adjacent tip 26 is reduced in thickness to minimize thermal conductivity therebetween. The shoulder formed by the reduction in wall thickness also aids in preventing the mass of resin 22 from being dislodged under pressure. Preferably, tip 26 is formed of stainless steel but other strong, corrosion resistant, electrically conductive material may be employed. One end of an insulated wire conductor 27 which is embedded in resin 22 is soldered to the flange of probe tip 26 and the other end thereof extends from the end of the probe. A thermistor 28, which is substantially identical to thermistor 24, is mechanically and electrically connected to the inner surface of the flat end wall of probe tip 26 by solder 29 and is in good thermal relationship with the probe tip. A hollow, cylindrical, fiber insulating tube 30, which is employed to center thermistor 28 during soldering, fits around the periphery of the thermistor and electrically insulates the edge of the latter from tip 26 in the event that the tip is dented or in the event that solder joint 29 breaks loose in use. Fiber tube 30 also affords support for a flat, circular, electrically conductive contact disc 31 which is biased into contact with the right side of thermistor 28 by a compression spring 32. One end of an insulated wire conductor 33 is soldered to contact disc 31 and the other end thereof is soldered to the left side of thermistor 24. One end of an insulated wire conductor 34 is soldered to wire conductor 33 and the other end thereof extends from the end of the probe. Spring 32 is held in compression by an insulating disc 35 which is preferably formed of fishpaper and which is secured to the flange of tip 26 by a suitable adhesive such as "Pliobond" or other means. Spring 32 also acts to maintain electrical contact between thermistor 28 and the inner side of tip 26 in the event that solder connection 29 fails for any reason. Fishpaper disc 35, which is provided with a small centrally located opening to accommodate wire conductor 33, also serves to prevent the resin 22 from flowing into hollow probe tip 26 during assembly of the probe, it being desirable that an air space be maintained within tip 26 to thermally insulate thermistor 28 from the body of the probe insofar as possible.

Referring again to thermistors 24 and 28 it is to be understood that each is formed of electrical resistance material which exhibits a decrease in resistance to the flow of electrical current therethrough upon being heated. Thus, in the embodiment shown each thermistor may be assumed to have a rating of 1000 ohms at 25° C. and 68 ohms at 100° C. Preferably, when thermistors 24 and 28 are mounted in probe 17 as shown and suitably energized, as will hereinafter be explained, they operate at about 93° C., although thermistor 24 operates at a slightly lower temperature because it dissipates heat to the resin 22. When probe 17 is immersed in oil flowing through flow line 13 the temperature of thermistor 28 drops substantially with respect to thermistor 24 and its electrical resistance increases to effect unbalance of the bridge circuit of which it forms a part, as will hereinafter be explained in connection with Fig. 4. Unbalancing of the bridge ultimately effects closure of a relay, as will be hereinafter explained. If oil flow ceases for any reason thermistor 28 again heats up and bridge balance is restored to effect opening of a relay. It is apparent from the hereinbefore described structure of probe 17 that in the presence of oil thermistor 28 dissipates heat much more rapidly thereto than thermistor 24. Thermistor 24 is provided to afford ambient temperature compensation for the probe. Changes in ambient temperature to which probe 17 is exposed effects corresponding temperature changes in both thermistors to maintain bridge balance.

Fig. 4 shows the motor 10 and a circuit for controlling its connection to and disconnection from the three-phase A.C. supply lines L1, L2 and L3. A manually operated circuit breaker 50, shown in open condition, is provided to connect the control circuit to the lines L1, L2 and L3.

An electroresponsive contactor 51 having normally open contacts 51b, 51c and 51d in the circuit connections between lines L1, L2 and L3 and the primary terminals T1, T2 and T3, respectively, of motor 10 is adapted to effect the energization of motor 10 whenever its operating coil 51a is energized. Contactor 51 also comprises a normally open interlock or maintaining contact 51e.

An automatic programming device 52, which is provided with a timer contact 52a shown in open condition, is connected on one side to line L2 and on its other side to line L3. It may be assumed that programming device 52 is of the type shown in a Forrest C. McNicol and Richard R. Ranson copending application Serial No. 589,048, dated August 19, 1958, now Patent No. 2,848,630, dated August 19, 1958, and now owned by the assignee of the instant application. In programming device 52 timer contact 52a opens and closes in accordance with a predetermined schedule. For purposes of illustration assume that programming device 52 has been adjusted so that when energized it will maintain timer contact closed for a fifteen minute interval and then open for a twelve hour interval and then repeat the cycle.

Operating coil 51a of contactor 51 is connected on one side to line L2 and its other is connectable to line L1 either through contact 52a of programming device 52 and starting switch 53, shown in open condition, or through interlock contact 51e of contactor 51, a normally open contact 54b of an electroresponsive "pump off" relay 54, and switch 53.

The primary winding 55a of a step-down transformer 55 which serves as a power source for the operating coil 54a of "pump off" relay 54 is connected across lines L2 and L3. The upper and lower end terminals of the secondary winding 55b of transformer 55 are connected to the input sides of the half-wave rectifiers 56 and 57, and the output sides of the latter rectifiers are connected to a common terminal 58. A smoothing capacitor 59 is connected between terminal 58 and a center tap 55c of secondary winding 55b of transformer 55. Rectifiers 56 and 57 are poled so that common terminal 58 will be electrically positive and center tap 55c will be electrically negative. Terminal 58 is connected to the input side of a half-wave rectifier 61 and the other side of the latter is connected to emitter terminal 62e of a transistor 62. A resistor 63 has one end connected to a point common between rectifier 61 and transistor 62. Rectifier 61 affords a negative bias between the emitter terminal 62e and base terminal 62b of transistor 62, which bias reduces the possibility of current flow between emitter terminal 62e and collector terminal 62c if the transistor 62 is subjected to elevated temperatures. Rectifier 61 is a germanium diode of a type which exhibits a substantially constant forward voltage drop versus current characteristic and is known in the trade as a "Stabistor." Its function is to bias the emitter terminal 62e of transistor 62 negatively with respect to the base terminal 62b, thereby reducing the flow of leakage current thorugh the emitter-collector circuit of the transistor and to tend to bias the latter to cutoff. While a conventional resistor element could be employed in place of rectifier or diode 61, such resistor would be inferior in operation since the potential drop across the resistor would increase linearly with current flow therethrough whereas the potential drop across the diode is relatively independent of current flow therethrough beyond a small characteristic value of the order of 0.3 to 0.4 volt. Collector terminal 62c of transistor 62 is connected to one side of coil 54a of "pump off" relay 54 and the other side of the coil is connected to center tap 55c of secondary winding 55b of transformer 55. A half-wave rectifier 65 is connected in parallel with coil 54a of "pump off" relay 54 to provide a path for dissipation of the current generated by decaying flux in relay coil 54a when the latter is deenergized so that the transistor 62 will not be damaged. Rectifier 65 also serves to prevent relay "chatter."

Transistor 62 which acts as a switch for the energization of coil 54a of "pump off" relay 54 may be assumed to be the P–N–P type. Unless a current of predetermined value is made to flow through the transistor from emitter terminal 62e to base terminal 62b, no significant current flows from emitter terminal 62e to collector terminal 62c.

The primary winding 66a of a step-down transformer 66 which serves as the power source for a bridge circuit 70 is connected across lines L2 and L3. The upper and lower end terminals of secondary winding 66b of transformer 66 are connected, respectively, to the input side of the half-wave rectifiers 67 and 68, and the load sides of the latter rectifiers are connected to a common terminal 69 and the latter terminal is connected to the power input terminal 70a of a normally balanced bridge circuit 70. The center tap 66c of secondary winding 66b of transformer 66 is connected to the power input terminal 70b of bridge circuit 70. Rectifiers 67 and 68 are poled so that common terminal 69 is electrically positive and center tap 66c is electrically negative.

Between circuit 70 comprises a resistor 71 connected between terminals 70a and 70c, a resistor 72 equal in value to resistor 71 connected between terminals 70a and 70d, the probe mounted thermistor 28 (hereinbefore described) connected between terminals 70b and 70c, and the probe mounted thermistor 24 (hereinbefore described) connected between terminals 70b and 70d. Because of manufacturing tolerances actual resistance values and thermistor values may vary as much as ten or fifteen percent from designated values and it is necessary to provide a potentiometer 73 to compensate therefor. Potentiometer 73 is also provided to effect adjustments to bridge circuit 70 necessary to compensate for wide differences in oil temperature to which the controller may be subjected. The resistance element 73a of potentiometer 73 is connected in series with a resistor 73b between terminals 70b and 70d of bridge circuit 70. The total value of resistance 73a and 73b is high with respect to that of any of other elements of the bridge 70 in normal operation. The end of the movable tap 73c of potentiometer 73 is connected to base terminal 62b of transistor 62. It may be assumed that movable tap 73c is in a position with respect to resistance element 73a whereby the bridge circuit 70 is normally balanced. It will be understood, for example, that if resistor 71 were of higher value than resistor 72 or if thermistor 28 were of lower value than thermistor 24, movement of tap 73c toward bridge terminal 70b to place more resistance in circuit would effect balancing of the bridge circuit 70. One end of a current limiting resistor 74 is connected to terminal 70c of bridge circuit 70 and the other end thereof is connected to the input side of a half-wave rectifier 75. The output side of rectifier 75 is connected to a point 76 between common terminal 58 and rectifier 61. A thermistor 77 is connected on one side of base terminal 62b of transistor 62 and on its other side to a point between rectifier 75 and point 76. In practice, thermistor 77 is mounted as close to transistor 62 as practicable so that it is subjected to the same ambient temperature. The function of thermistor 77 is to control transistor 62 in the event of ambient temperature changes. Normally, a small amount of leakage current tends to flow through transistor 62 from the lower end of the secondary winding of transformer 55 through rectifier 57, terminal 58, thermistor 77, base 62b, collector 62c and operating coil 54a to center tap 55c. This current flow causes a voltage drop across thermistor 77 of opposite polarity to the negative bias voltage drop across diode 61 and tending to oppose the latter in the emitter-base circuit. However, due to the small value of such leakage current, such opposing voltage is less than the negative bias voltage and the transistor remains biased to cutoff assuming no signal is applied from the bridge. Increase in the temperature of transistor 62 tends to increase this leakage current flow. If a conventional resistor were employed in place of thermistor 77, increase in such leakage current flow would increase the voltage drop across such conventional resistor to bring the base of transistor 62 more negative thereby tending to turn the transistor "on." Thermistor 77 prevents this. Increase in the ambient temperature of transistor 62 tending to increase such leakage current flow causes the value of resistance of thermistor 77 to decrease. As a result, the voltage drop across thermistor 77 decreases to bring the base of transistor 62 more positive to bias the transistor "off."

In the above described circuit, when bridge circuit 70 is suitably energized thermistors 24 and 28 heat up to a predetermined temperature. By cooling thermistor 28, which is mounted in probe tip 26 a predetermined amount, its resistance increases exponentially to effect unbalance of the bridge thereby causing a control signal to appear across emitter terminal 62e and base terminal 62b of transistor 62. Thermistor 24, which is embedded in the body of probe 17, is employed to afford a degree of ambient temperature compensation, therefore changes in temperature which affect both thermistors equally effect substantially no change in the balance of the bridge 70. If, however, thermistor 24 were deleted from the circuit (provided suitable change were made in bridge circuit 70) extreme change in ambient temperature might affect thermistor 28 sufficiently to cause unbalance of the bridge and undesired operation of the controller.

Fig. 5, which is enclosed within the dotted line designated 49, shows that a normally open contact 51f under the control of operating coil 51a of contactor 51 may be inserted in line L3. With this modification transformers 55 and 66 and those portions of the controller energizable therefrom would remain deenergized except when coil 51a is energized and contact 51f is closed (i.e., when pump motor 10 is in operation). In all other respects, however, a controller having this modification will operate in substantially the same manner as that of Fig. 4, as will be explained hereinafter. The arrangement shown in Fig. 4, is preferred where low ambient temperatures (on the order of zero degrees Fahrenheit) are encountered in order that probe 17 and thermistors 24 and 28 therein may be kept heated and in readiness for operation.

The controller shown in Figs. 1 through 4 operates as follows:

Assume that the U-shaped portion of flow line 13 has drained free of crude oil since pump motor 10 last operated and that probe 17 is exposed to gas which has accumulated therein. Further, assume that switch 53 is closed. Closure of circuit breaker 50 effects energization of transformers 55 and 66 and effects energization of programming device 52 which will automatically close timer contact 52a for fifteen minutes at some preselected time (the end of the aforementioned eleven and three-quarter hour interval).

With transformer 66 energized, rectified current flows from common terminal 69 to bridge terminal 70a whereupon it divides to flow through resistor 71 and thermistor 28 to bridge terminal 70b and through resistor 72 and thermistor 24 to bridge terminal 70b. Current flow from bridge terminal 70d through resistance 73a of potentiometer 73 and through resistor 73b to bridge terminal 70b is small because of the relatively high total resistance thereof. From bridge terminal 70b the current flows to center tap 66c of secondary winding 66b of transformer 66. Since probe 17 is not immersed in oil both thermistors 24 and 28 heat up (thermistor 24 operating at a slightly lower temperature than thermistor 28, as hereinbefore explained) and bridge circuit 70 remains balanced, i.e., no potential difference exists between bridge terminal 70c and movable tap 73c of potentiometer 73.

With transformer 55 energized, rectified current flows from common terminal 58, through rectifier 61, through point 64, through resistor 63, to center tap 55c of secondary winding 55b of transformer 55. Since transistor 62 is still biased to "cut-off" no current flows from point 64, through transistor 62 (from emitter terminal 62e to collector terminal 62c), through coil 54a of "pump off" relay 54, to center tap 55c. Accordingly, "pump off" relay 54 remains deenergized and contact 54b remains open.

Now assume that programming device 52 has automatically effected closure of timer contact 52a, which will remain closed for a fifteen minute interval. A circuit is thus established from line L1, through closed switch 53, through timer contact 52a, through operating coil 51a of contactor 51, to line L2. Energization of contactor 51 effects closure of contacts 51b, 51c and 51d to connect pump motor 10 to lines L1, L2 and L3 and also effects closure of interlock contact 51e. Shortly after pump motor 10 commences to operate oil begins to flow through flow line 13 and probe 17 becomes immersed in oil which tends to dissipate heat from thermistor 28 at a much more rapid rate than from thermistor 24. Accordingly, the resistance of thermistor 28 increases and the bridge circuit 70 becomes unbalanced, i.e., bridge terminal 70c becomes more positive than movable tap 73c of potentiometer 73. Current flows from bridge terminal 70c, through resistor 74, through rectifier 75, through point 76, through rectifier 61, through point 64, through transistor 62 (from emitter terminal 62e to base terminal 62b), to movable tap 73c of potentiometer 73. Transistor 62 is thus biased to "on" and rectified current begins to flow from point 64, through transistor 62 (from emitter terminal 62e to collector terminal 62c), through coil 54a of "pump off" relay 54, to center tap 55c of secondary winding 55b of transformer 55. Energization of "pump off" relay 54 effects closure of relay contact 54b and a circuit is established from line L1, through switch 53, through contact 54b, through contact 51e, through operating coil 51a of contactor 51, to line L2. Preferably, the elapsed time between immersion of probe 17 in oil until closure of contact 54a of "pump off" relay 54 is about three seconds.

Assuming that oil is still flowing through flow line 13 at the end of the fifteen minute interval when programming device 52 automatically effects opening of timer contact 52a (which would normally be the case) it is apparent that contactor 51 remains energized and that pump motor 10 will continue to operate.

Now assume that a well "pump off" occurs sometime during the twelve hour interval during which timer contact 52a is open. When the "pump off" occurs oil flow through flow line 13 ceases even though pump motor 10 is still operating and the U-shaped portion of the flow line drains free of oil exposing probe 17 to gas which accumulates therein. The horizontal disposition of probe 17 facilitates the draining of any residual oil which may tend to cling to probe tip 26. Thermistor 28, no longer cooled by oil flow, begins to heat up, its resistance decreases, and the balance of bridge circuit 70 is restored. Since a potential difference no longer exists between bridge terminal 70c and movable tap 73c of potentiometer 73, control current no longer flows through transistor 62 from emitter terminal 62e to base terminal 62b and the transistor again biases to "cut-off" thereby effecting deenergization of coil 54a of "pump off" relay 54 and opening of contact 54b thereof. Since timer contact 52a is already open, opening of "pump off" contact 54b effects deenergization of operating coil 51a of contactor 51 and the contacts 51b, 51c, 51d and the interlock contact 51e open to disconnect pump motor 10 from the supply lines L1, L2 and L3. Preferably, the elapsed time between complete cessation of oil flow and disconnection of pump motor 10 is about thirty seconds. Pump motor 10 remains deenergized until programming device 52 automatically recloses timer contact 52a at the end of the aforementioned eleven and three-quarter hour interval and the above described cycle of operation repeats itself.

It is important to note that in some instances a well does not "pump off" abruptly but gradually furnishes less oil and greater quantities of gas. These slugs of gas passing through the U-shaped portion of flow line 13 momentarily free probe 17 from immersion in oil. If the slugs of gas free probe 17 from immersion in oil for a sufficiently long period (on the order of thirty seconds or longer) or if the slugs of gas pass through frequently enough it is apparent that thermistor 28 will heat up sufficiently to effect opening of contact 54a of "pump off" relay 54 and subsequent deenergization of pump motor 10, as hereinbefore described.

It will also be apparent that if a "pump off" occurs during the fifteen minute interval while programming device 52 maintains timer contact 52a closed, the contact 54b of "pump off" relay 54 will open, as hereinbefore described, but pump motor 10 will not be deenergized until the end of the fifteen minute interval when timer contact 52a opens.

It is also clear that opening of manual switch 53 at any time while operating coil 51a of contactor 51 is energized will effect deenergization thereof and disconnection of pump motor 10 from its source of power supply.

Note also that if operating coil 51a of contactor 51 is deenergized due to low voltage on lines L1 and L2, or for some other reason, the contacts 51b, 51c, 51d and 51e open and pump motor 10 is disconnected from its source of supply. Upon restoration of normal power, contactor 51 will not be reenergized unless timer contact 52a of program device 52 is closed. Even though power restoration occurs before contact 54b of "pump off" relay 54 has had an opportunity to drop out because of the interruption of oil flow, interlock contact 51e being open prevents establishment of an energizing circuit for operating coil 51a of contactor 51, except through contacts 52a. This arrangement prevents nullification of the feature of sequential starting of a multiplicity of pump motors in those installations in which the timer affords such a feature.

As hereinbefore mentioned, a circuit incorporating the modifications shown in Fig. 5 operates in much the same manner as described. It will be understood, however, that because of the insertion of normally open contacts 51f of contactor 51 in line L3 transformers 55 and 66 and the circuitry energizable therefrom are normally deenergized. When timer contact 52a closes to effect energization of operating coil 51a of contactor 51, the contacts 51b, 51c and 51d close to effect energization of pump motor 10 and contacts 51e and 51f also close. When contact 51f closes transformers 55 and 66 becomes energized. The circuit then operates as hereinbefore described and contact 51f remains closed as long as operating coil 51a of contactor 51 is energized. When a "pump off" occurs and operating coil 51a becomes deenergized, as hereinbefore described, contact 51f opens and remains open until timer contact 52a is automatically reclosed by programming device 52. The chief advantage of the modification shown in Fig. 5 is that it tends to prolong the life of the components energizable from transformers 55 and 66.

We claim:

1. In combination, a first source of D.C. power supply, a transistor having an emitter, collector and base terminal, said transistor normally biased to cut-off, electroresponsive means connected in series with the emitter-collector circuit of said transistor across said first source, a second source of D.C. power supply, a normally balanced bridge circuit having its input terminals connected across said second source and having one of its output terminals connected to the emitter terminal of said transistor, said bridge circuit including a first thermistor in one leg thereof and a second thermistor in another leg thereof, one of said thermistors adapted to be cooled to effect unbalance of said bridge circuit, a potentiometer for effecting adjustments of said bridge circuit, said potentiometer comprising resistance means connected in parallel with one of said thermistors and further comprising a tap which is connected to the base terminal of said transistor, and a third thermistor connected between the side of said first source to which said emitter is most directly connected and said base terminal of said transistor and adapted to be subjected to the same ambient temperature as the latter to maintain the latter normally biased to cut-off while said bridge circuit is normally balanced.

2. The combination according to claim 1 including diode biasing means connected in circuit with said transistor to bias the latter to cut-off when said bridge circuit is balanced.

3. In a thermal responsive system for controlling a load, a first power supply source, a transistor having emitter and collector and base terminals, means connecting the load in series with the emitter-collector circuit of said transistor across said first source, bias means supplied from said first source, means for applying a bias voltage from said bias means across said emitter and base terminals normally to bias said transistor to cutoff and to deenergize the load, a thermal responsive element connected between the side of said first source to which said emitter terminal is most directly connected and said base terminal of said transistor and arranged to be subject to the same ambient temperature as said transistor, said bias voltage being greater than the opposing voltage drop across said thermal responsive element in the emitter-base circuit of said transistor to maintain the latter biased to cutoff, said transistor being subject to a leakage current flow tending to cause undesired energization of the load, such leakage current flow being subject to increase in response to increase in the temperature of said transistor, said thermal responsive element having a temperature responsive characteristic of a direction and magnitude such as to vary the bias voltage across the emitter-base junction of said transistor sufficient to offset such increased leakage current flow to maintain said transistor normally biased to cutoff, a second power supply source, a bridge circuit having input terminals connected across said second source and having output terminals, at least one thermistor in a leg of said bridge circuit for causing changes in the balance of said bridge circuit in response to temperature changes thereof to provide a control voltage at said output terminals as a function of such change in balance, and means for applying said control voltage in opposition to said bias voltage derived from said bias means across said emitter and base terminals to render said transistor conducting and to energize the load.

4. The invention defined in claim 3, wherein said bias means comprises a diode having a substantially constant forward voltage drop thereacross even if the current flow therethrough varies, and said constant voltage drop being applied to bias said transistor to cutoff.

5. The invention defined in claim 4, wherein said thermal responsive element comprises a compensating thermistor having a negative temperature coefficient of resistance selected primarily in dependence upon the characteristics of said transistor and the value of said control voltage.

6. The invention defined in claim 5, wherein one side of said first source is connected through said diode and said emitter and collector terminals and the load in series to the other side of said first source, said compensating thermistor is connected between said one side of said first source and said base terminal, and said output terminals of said bridge circuit are connected across said diode and the emitter-base junction of said transistor.

References Cited in the file of this patent

UNITED STATES PATENTS

| | | |
|---|---|---|
| 2,272,492 | Weyher | Feb. 10, 1942 |
| 2,522,826 | Hooven | Sept. 19, 1950 |
| 2,532,287 | Buckeridge | Dec. 5, 1950 |
| 2,600,891 | MacNeille | June 17, 1952 |
| 2,653,299 | Ginzton | Sept. 22, 1953 |
| 2,654,057 | Rivenburg | Sept. 29, 1953 |
| 2,693,572 | Chase | Nov. 2, 1954 |
| 2,826,072 | Kliever | Mar. 11, 1958 |
| 2,859,402 | Shaeve | Nov. 4, 1958 |
| 2,864,962 | Jensen | Dec. 16, 1958 |